United States Patent [19]

Erard et al.

[11] 4,268,651

[45] May 19, 1981

[54] TWO-PHASE VINYL CHLORIDE POLYMERIZATION

[75] Inventors: François Erard, Ecully, France; Salomon Soussan, Saint-Symphorien D'Ozon, both of France

[73] Assignee: Rhone-Poulenc Industries, Paris, France

[21] Appl. No.: 53,356

[22] Filed: Jun. 29, 1979

Related U.S. Application Data

[63] Continuation-in-part of Ser. No. 941,642, Sep. 12, 1978, abandoned.

[30] Foreign Application Priority Data

Sep. 12, 1977 [FR] France ................................ 77 27429

[51] Int. Cl.³ .............................................. C08F 14/06
[52] U.S. Cl. ...................................... 526/65; 428/402; 526/78; 526/87; 526/202; 526/203; 526/344
[58] Field of Search ...................... 526/65, 78, 87, 344

[56] References Cited

U.S. PATENT DOCUMENTS 3,683,051  8/1972  Chatelain .............................. 526/87

*Primary Examiner*—Harry Wong, Jr.

*Attorney, Agent, or Firm*—Burns, Doane, Swecker & Mathis

[57] ABSTRACT

Vinyl chloride polymers are prepared by polymerization or copolymerization in mass, in two phases, comprising prepolymerizing vinyl chloride monomers in a first phase under highly turbulent agitation until a degree of conversion thereof between about 5 and 15% is attained, and thence, in a second distinct phase, polymerizing said prepolymerized reaction product through reaction completion under mild agitation, said process being characterized in that [1] there is added to the reaction medium, prior to same attaining a polymer content of about 15% by weight, an additive selected from the group comprising (a) a copolymer of vinyl acetate and an ethylenically unsaturated carboxylic acid monomer copolymerizable therewith, and (b) a condensate of ethylene oxide on a polypropylene glycol backbone, and in that [2] the reaction rate is controlled such that the period of time during which the content by weight of polymer or copolymer in the reaction medium is comprised between 15 and 25% is less than 45 minutes. The reaction product comprises at least 95% by weight of a fraction which will pass through a 250 micron mesh sieve.

19 Claims, No Drawings

TWO-PHASE VINYL CHLORIDE POLYMERIZATION

CROSS-REFERENCE TO RELATED APPLICATION

This is a continuation-in-part of our copending application, Ser. No. 941,642, filed Sept. 12, 1978, and now abandoned assigned to the assignee hereof, and hereby expressly incorporated by reference in its entirety and relied upon.

BACKGROUND OF THE INVENTION

1. Field of the Invention

The present invention relates to a process for the mass production, in two distinct phases, of vinyl chloride based polymers and copolymers having a low content of the coarser particulates, as well as to the particular polymers and copolymers produced thereby.

2. Description of the Prior Art:

The mass or bulk polymerization of a monomer formulation based on vinyl chloride initially progresses in the liquid monomer phase. Because of the insolubility of the polymer or copolymer in the monomer composition, the reaction product separates in the solid state during the course of polymerization. When the content of the reaction medium in polymer or copolymer attains a value on the order of 15% by weight, its consistency becomes comparable to that of agitated, curdled milk. This consistency prevails until the monomer composition no longer defines a continuous liquid phase; this occurs when the amount by weight of the reaction medium in polymer or copolymer attains a value on the order of 25%. Beyond this value, the reaction medium approximates a powdery state.

It has already been proposed to this art to prepare polymers and copolymers based on vinyl chloride by the polymerization or copolymerization, in mass, in two phases, by a process consisting of conducting the polymerization or copolymerization [1] by maintaining the highest possible velocity of agitation during an initial phase, until a rate of conversion of the monomer formulation on the order of 7 to 15% and preferably on the order of 8 to 12%, is attained, [2] then reducing the velocity of agitation during a second phase in the reaction to the lowest possible value, but still sufficient to assure good heat exchange within the polymerization recipe, and [3] maintaining this rate to the end of said reaction. According to these techniques, the two phases, the first performed under a high turbulence agitation, the second with a low rate of agitation, may be performed either in a single autoclave or polymerization vessel or in different autoclaves, the phases being designated prepolymerization and polymerization, respectively, and the appropriate apparatus therefore being designated prepolymerizer and polymerizer, also respectively.

Also in accordance with the aforesaid techniques, the second phase is conducted either with a reaction medium consisting solely of the monomer/polymer composition originating from the first phase of polymerization, or together with said monomer/polymer composition, a supplementary vinyl chloride base monomer composition, identical to or different from the composition employed during the first phase, and one or more polymerization initiators.

These particular processes and their noted variants are described in detail in the French patents and respective certificates of addition (CA) thereto which follow (all being assigned to Produits Chimiques Pechiney Saint-Gobain): French Pat. No. 1,357,736, CA's 83,377, 83,383 and 83,714; French Pat. No. 1,382,072, CA's 84,958, 84,965, 84,966 [all corresponding to U.S. Pat. No. 3,522,227], 85,672 [corresponding to U.S. Pat. Nos. 3,562,237 and 3,544,280] and 89,025 [corresponding to U.S. Pat. No. 3,558,584]; French Pat. No. 1,436,744, CA's 87,620, 87,623, 87,625 and 87,626 [all corresponding to U.S. Pat. No. 3,687,919]; French Pat. No. 1,450,464 [corresponding to U.S. Pat. No. 3,687,923]; French Pat. No. 1,574,734 [corresponding to U.S. Pat. No. 3,683,051] and French Pat. No. 1,605,157 [corresponding to British Specification No. 1,260,377] [all hereby expressly incorporated by reference].

Such processes and variations thereon reproducibly yield vinyl chloride polymers and copolymers, which, after screening, exhibit the important properties of high apparent density and narrow granulometric distribution, which may be controlled as desired.

However, prior to screening, these polymers and copolymers prepared according to the foregoing processes have a high content of coarse products having practically no commercial value. Thus, that fraction thereof passing through a 250 micron mesh screen, variable as a function of the AFNOR viscosity index of the polymer or copolymer, determined by the NFT 51013 standard, does not exceed 94% by weight.

SUMMARY OF THE INVENTION

Accordingly, a primary object of the subject invention is to provide for the production of vinyl chloride polymers and copolymers comprising a fraction which passes through a 250 micron mesh screen of between 95 and 98% of the total weight thereof and, typically, which has a higher apparent density for an equivalent porosity, and vice versa.

DETAILED DESCRIPTION OF THE INVENTION

More particularly, the topic polymerization or copolymerization of the vinyl chloride based monomer composition is conducted during a first phase under conditions of high turbulence agitation, until a degree of conversion of the monomer composition of 5 to 15% is attained, then optionally adding to the reaction medium a supplemental amount of a vinyl chloride based monomer composition, identical to or different from the composition employed during the first phase and thence, during a second phase, conducting the final polymerization or copolymerization under slow agitation of the recipe thus formed.

It is one characteristic feature of the invention that, prior to attaining a polymer or copolymer content of 15% by weight in the reaction mix, at least one auxiliary compound or additive is introduced thereto, said compound or additive being selected from the group comprising:

(a) a copolymer comprising from 80 to 98%, and preferably 90 to 96% by weight, of vinyl acetate and from 2 to 20%, and preferably 4 to 10% by weight, of at least one ethylenically unsaturated carboxylic acid selected from the group comprising acrylic acid, methacrylic acid, crotonic acid and maleic acid, having a viscosity limit comprised between 0.10 and 0.25; and/or (b) ethylene oxide condensates on a polypropylene glycol backbone, having a molecular weight of between 900 and 2,300 and an ethylene oxide/propylene glycol weight ratio comprised between 10 and 90%. The auxiliary compound may be added but once or over several additions during the first phase and/or during the course of the second phase of polymerization.

It is another characteristic feature of the invention that the reaction rate is controlled so that the period of time during which the content by weight in polymer or copolymer of the reaction medium is comprised between 15 to 25%, is less than 45 minutes.

It has now been determined during the bulk or mass polymerization of the polymers or copolymers based on vinyl chloride, that the formation of a coarse product takes place essentially when the consistency of the reaction medium is comparable to that of agitated curdled milk. For reasons of simplicity, the period of time during which the content by weight of the reaction medium in polymer or copolymer is comprised between 15 and 25%, will be designated hereinafter as the "critical period". Thus, it has been found that by introducing into the reaction medium, before the content in polymer or copolymer of said medium attains a value of 15%, at least one of the auxiliary compounds or additives mentioned hereinabove, and by sufficiently reducing the duration of said critical period, only a slight amount of coarse product content will result.

The "limiting viscosity" of the copolymers of vinyl acetate and of at least one of the aforesaid acids is expressed in milliliters per 100 grams and is equal to the limiting value when C approaches zero in the following relationship:

$$(\eta_{sp}/C) = (\eta - \eta_o/\eta_o C)$$

wherein:
— $\eta_{sp}$ is the specific viscosity of a copolymer solution in a solvent,
— $\eta$ is the dynamic viscosity of the solution,
— $\eta_o$ is the dynamic viscosity of the pure solvent,
— C is the concentration of the copolymer solution in grams per 100 ml of solvent.

Said ratio is determined by measuring at 20° C. the time of the flow t of the solution of concentration C and the time of the flow $t_o$ of the pure solvent in a capillary tube viscosimeter. It is given by the formula:

$$(t = t_o/t_o C)$$

The solvent is acetone. The value of the ratio $\eta_{sp}/C$ is determined for different values of C, such as, for example, 0.25; 0.5; 0.75 and 1 g/100 ml of the solvent and the limiting viscosity of the copolymer obtained by the graphic extrapolation of the curves plotting $\eta_{sp}/C$ as a function of C.

The proportion or amount of the auxiliary compound to be introduced into the reaction medium, with respect to the total amount of the monomer composition employed, is a function of its nature. In the event that a vinyl acetate copolymer is employed as the additive, comprising at least one of the acids above mentioned, this amount if typically comprised between 1 and 600 ppm. A great amount of the copolymer leads to a resin having better heat stability. To obtain a fine and rapid dispersion of the copolymer in the reaction medium, it may be introduced either as is, or in the form of a 30 to 70% by weight solution in an organic solvent, such as a low molecular weight alcohol, for example, methanol, ethanol or propanol.

In the event that a condensate of ethylene oxide and propylene glycol is employed as the auxiliary compound, the amount added is typically comprised between 1 and 50 ppm and preferably between 1 and 15 ppm. An excessive amount of this additive may lead to a colored resin having reduced heat stability. The condensate is introduced as such into the reaction medium.

To regulate the velocity of the reaction so that the duration of the critical period is less than 45 minutes, any appropriate means or any combination of appropriate means may be employed. Generally, such regulation is effected by controlling the temperature of the reaction medium and/or by suitable choice, both qualitatively and quantitatively, of the polymerization initiator or initiators. The selection of the temperature of the reaction medium is essentially a function of both the molecular weight of the resin to be obtained, i.e., of its viscosity index determined by the AFNOR NFT 51013 standard and of the necessity to conduct the polymerization so that the duration of the critical period be less than 45 minutes. These two conditions may be satisified simultaneously is any one of a number of ways. Since the proportion of the monomer composition transformed at the completion of the first phase of the process is at the most equal to 15%, the temperature of the reaction medium adopted during said first phase evidently has no effect on the duration of the critical period, but does not decisively affect the value of the AFNOR viscosity of the final resin either. It follows that, in particular, a first phase of limited duration may be attained by conducting the reaction at a temperature markedly higher than the temperature corresponding to the value of the AFNOR viscosity selected. By way of example, it is possible to conduct the first phase of polymerization at 70° C., to prepare a polyvinyl chloride having an AFNOR 135 viscosity index to which a polymerization temperature of approximately 48° C. corresponds.

Concerning the second stage of the process, it is possible, for example, if the efficacy of the polymerization initiator or initiators selected to effect the final polymerization or copolymerization is relatively high, to maintain the reaction medium at a constant temperature over the full course of said phase. Contrariwise, the temperature of the reaction medium, at the beginning of the second phase, may be controlled at a sufficiently high level and for a period of time sufficient in order that the duration of the critical period be less than 45 minutes and the polymerization of copolymerization may be continued at a temperature sufficiently low as to obtain a resin having the AFNOR viscosity index desired.

According to the invention, any polymerization initiator capable of use for the preparation in mass of vinyl chloride based polymers and copolymers may be employed, and particularly those selected from the group comprising compounds of azo type, such as azodiisobutyronitrile; peroxides, such as lauroyl peroxide, acetyl-cyclohexanesulfonyl peroxide, isobutyroyl peroxide, dichloroacetyl peroxide, trichloroacetyl peroxide; peroxydicarbonates, such as ethyl peroxydicarbonate, ethylhexyl peroxydicarbonate, isopropyl peroxydicarbonate, isobutyl peroxydicarbonate, tertbutyl permethoxyacetate, tertbutyl perethoxyacetate, tertbutyl perphenoxy-2-propionate.

In order to further illustrate the present invention and the advantages thereof, the following specific examples are given, it being understood that same are intended only as illustrative and in nowise limitative. The apparatus utilized in the Examples 1–28 was as described in the Example 1. The viscosity index of the resultant vinyl chloride based polymers and copolymers was determined by AFNOR standard NFT 51013.

EXAMPLE 1

This example is presented for comparative purposes.

Into a stainless steel prepolymerizer having 200 liter capacity, equipped with an agitator consisting of a "Lightnin" type turbine bearing 6 paddle plates 215 mm in diameter, 135 kg vinyl chloride were introduced and the apparatus purged by degassing 10 kg of the vinyl chloride. Similarly, 3.47 g acetylcyclohexanesulfonyl peroxide corresponding to 0.25 g active oxygen and 11.1 g ethyl peroxydicarbonate corresponding to 1 g active oxygen, were introduced. The velocity of agitation was controlled at 500 rpm.

The temperature in the reaction medium in the prepolymerizer was raised and maintained at 69° C., corresponding to a relative pressure of 11.5 bar in the prepolymerizer.

After 20 minutes of prepolymerization, the degree of conversion was in the vicinity of 10% and the prepolymer was transferred to a vertical stainless steel polymerizer of 400 liter capacity, equipped with a double jacket, previously purged by degassing 20 kg vinyl chloride and containing 130 kg vinyl chloride, and 6.94 g acetylcyclohexanesulfonyl peroxide corresponding to 5 g of active oxygen. The polymerizer was equipped with two independently controlled agitators. One of said agitators (A) consisted of a strip, helically wound about a rotating shaft traversing the upper part of the polymerizer on its axis, while the other (B) consisted of two arms conforming to the bottom of the polymerizer and connected with a gudgeon traversing the bottom of the polymerizer on its axis. The velocity of agitation of the agitator A is controlled at 50 rpm and that of agitator B at 30 rpm. The temperature of the reaction medium was rapidly raised and then maintained at 46° C., corresponding to a relative pressure of 6.3 bar in the polymerizer. The duration of the critical period was 60 minutes. The polymerization in the polymerizer continued for 6.5 hours.

Following degassing, a powdery polymer having an AFNOR 144 viscosity index was recovered, in a yield of 65%. The portion of said polymer passing through a 250 micron mesh sieve represented 88% by weight thereof; same displayed an apparent density of 0.48 g/cm$^3$ and could take up 32 ml plasticizer in the cold state.

EXAMPLE 2

This example is also presented for comparative purposes.

Prepolymerization was conducted as in Example 1, but with the introduction into the prepolymerizer of 62.5 g of a 40% by weight solution in propanol of a vinyl acetate/crotonic acid copolymer composed by weight of 91% vinyl acetate and 9% crotonic acid, with a limiting viscosity of 0.172, corresponding to 100 ppm of said copolymer with respect to the total amount of vinyl chloride employed.

Polymerization conditions were identical to those of Example 1, signifying that the duration of the critical period was also equal to 60 minutes. Following degassing, with a yield of 65%, a powdery polymer having an AFNOR viscosity index of 144 was recovered. The portion of said polymer passing through a 250 micron mesh sieve represented 88% by weight thereof; same displayed an apparent density of 0.48 g/cm$^3$ and could take up 32 ml plasticizer when cold.

EXAMPLE 3

This example too is presented for comparative purposes.

The process conducted was that of Example 1, but with the replacement of the acetylcyclohexanesulfonyl peroxide introduced in the polymerizer by 81.5 g isobutyroyl peroxide corresponding to 7.5 g active oxygen. The duration of the critical period was 20 minutes.

After degassing, with a yield of 65%, a powdery polymer having an AFNOR viscosity index of 144 was recovered. The portion of said polymer passing through a 250 micron mesh sieve represented 88% by weight thereof; same displayed an apparent density of 0.48 g/cm$^3$ and could take up 32 ml of plasticizer in the cold state.

EXAMPLE 4

Prepolymerization was conducted as in Example 1, but with the introduction into the prepolymerizer of 62.5 g of a 40% by weight solution in propanol of a vinyl acetate/crotonic acid copolymer composed by weight of 91% vinyl acetate and 9% crotonic acid, with a limiting viscosity of 0.172, amounting to 100 ppm of said copolymer with respect to the total amount of vinyl chloride employed.

After 20 minutes of prepolymerization, the percentage of conversion being about 10%, the prepolymer was transferred to the polymerizer. The conditions of polymerization were identical to those of Example 1, except that the temperature of the reaction medium was raised to 52° C., corresponding to a relative pressure of 7.5 bar and that, after 20 minutes of polymerization, the temperature was reduced over 30 minutes to 45° C., corresponding to a relative pressure of 6 bar. The duration of the critical period was 30 minutes. The polymerization in the polymerizer lasted for 5.75 hours.

After degassing, with a yield of 65%, a powdery polymer having an AFNOR viscosity index of 143, was recovered. The proportion of said polymer passing through a 250 micron mesh sieve represented 97% by weight thereof; same displayed an apparent density of 0.51 g/cm$^3$, and could take up 32 ml of a plasticizer in the cold state.

EXAMPLE 5

The process was conducted as in Example 4, but in place of the solution of the vinyl acetate/crotonic acid copolymer, 1.25 g of an ethylene oxide condensate with polypropylene glycol, having a molecular weight of 1,750 and an ethylene oxide/propylene glycol weight ratio of 80, amounting to 5 ppm of said condensate with respect to the total amount of vinyl chloride employed, was introduced into the prepolymerizer. The duration of the critical period was 30 minutes.

After degassing, with a yield of 65%, a powdery polymer having an AFNOR viscosity index of 144 was recovered. The portion of said polymer passing through a 250 micron mesh sieve represented 96% by weight thereof; same displayed an apparent density of 0.50 g/cm$^3$, and could take up 31 ml of a plasticizer in the cold state.

EXAMPLE 6

The process was conducted as in Example 3, but 65 g of the solution of vinyl acetate/crotonic acid copolymer used in Example 2, amounting to 104 ppm with respect to the total amount of vinyl chloride, were introduced into the prepolymerizer. The duration of the critical period was 20 minutes.

After degassing, with a yield of 64%, a powdery polymer having an AFNOR viscosity index of 143 was recovered. The portion of said polymer passing through a 250 micron mesh sieve represented 97% by weight thereof; same displayed an apparent density of 0.51 g/cm$^3$, and could take up 32 ml of plasticizer in the cold state.

EXAMPLE 7

The process was conducted as in Example 3, but 1.25 g of the condensate of ethylene oxide with polypropylene glycol used in Example 5, amounting to 5 ppm of said condensate with respect to the total amount of vinyl chloride used, was introduced into the prepolymerizer. The duration of the critical period was 20 minutes.

After degassing, with a yield of 63%, a powdery polymer having an AFNOR viscosity index of 144 was recovered. The portion of said polymer passing through a 250 micron mesh sieve represented 96% by weight thereof; same displayed an apparent density of 0.50 g/cm$^3$, and could take up 32 ml of plasticizer in the cold state.

EXAMPLE 8

This example is also given for purposes of comparison.

Into the prepolymerizer, 133 kg vinyl chloride were introduced and the apparatus was purged by degassing 10 kg vinyl chloride. Similarly, 2 kg vinyl acetate, 5.56 g acetylcyclohexanesulfonyl peroxide corresponding to 0.4 g active oxygen and 13.35 g ethyl peroxydicarbonate corresponding to 1.2 g active oxygen, were introduced. The velocity of agitation was controlled at 500 rpm. The temperature of the reaction medium was raised to and maintained at 70° C., corresponding to a relative pressure of 11.3 bar in the prepolymerizer.

After 20 minutes of prepolymerization, the percentage of conversion being about 10%, the prepolymer was transferred to the polymerizer previously purged by degassing 18 kg vinyl chloride and containing 127 kg vinyl chloride, 3 kg vinyl acetate and 76.4 g acetylcyclohexanesulfonyl peroxide corresponding to 5.5 g active oxygen. The velocity of agitation of the agitator A was controlled at 50 rpm and that of the agitator B at 30 rpm. The temperature of the reaction medium was rapidly raised to and maintained at 47° C., corresponding to a relative pressure of 6.2 bar in the polymerizer. The duration of the critical period was 65 minutes. The polymerization in the polymerizer lasted for 6.5 hours.

After degassing, with a yield of 63%, a powdery copolymer of vinyl chloride and vinyl acetate composed of 99% by weight of vinyl chloride and 1% of vinyl acetate, having an AFNOR viscosity index of 142, was recovered. The portion of said copolymer passing through a 250 micron mesh sieve represented 85% by weight thereof; same displayed an apparent density of 0.50 g/cm$^3$ and could take up 32 ml of plasticizer in the cold state.

EXAMPLE 9

The process of prepolymerization was conducted as in Example 8, but with the introduction into the prepolymerizer of 25 g of a vinyl acetate/crotonic acid copolymer, composed of 91% by weight vinyl acetate and 9% crotonic acid, a viscosity limit of 0.172, amounting to 100 ppm of said copolymer with respect to the total amount of the monomer composition employed.

After 20 minutes of prepolymerization, the percentage of conversion being approximately 10%, the prepolymer was transferred to the polymerizer. Polymerization conditions were identical to those of Example 8, except that the temperature of the reaction medium was raised to 53° C., corresponding to a relative pressure of 7.4 bar and that, after 20 minutes of polymerization, the temperature was reduced, over 30 minutes, to 46° C., corresponding to a relative pressure of 5.9 bar. The duration of the critical period was 35 minutes. Polymerization in the polymerizer lasted for 5.75 hours.

After degassing, with a yield of 64%, a powdery copolymer of vinyl chloride and vinyl acetate composed by weight of 99% vinyl chloride and 1% vinyl acetate having an AFNOR viscosity index of 141, was recovered. The portion of said copolymer passing through a 250 micron mesh sieve represented 97% by weight thereof; same displayed an apparent density of 0.53 g/cm$^3$, and could take up 32 ml of plasticizer in the cold state.

EXAMPLE 10

This example is also given for purposes of comparison.

The process was conducted as in Example 8, but the acetylcyclohexanesulfonyl peroxide introduced into the polymerizer was replaced by 67.9 g isobutyroyl peroxide corresponding to 6.25 g active oxygen. The duration of the critical period was 20 minutes.

After degassing, with a yield of 63%, a powdery copolymer of vinyl chloride and vinyl acetate consisting of 99% vinyl chloride and 1% vinyl acetate by weight, with an AFNOR viscosity of 142. The portion of said copolymer passing through a 250 micron mesh sieve represented 85% by weight thereof; same displayed an apparent density of 0.50 g/cm$^3$ and could take up 32 ml plasticizer in the cold state.

EXAMPLE 11

The process was conducted as in Example 10, but with the introduction into the prepolymerizer of 65 g of the solution of vinyl acetate/crotonic acid copolymer used in Example 2, corresponding to 104 ppm of said copolymer with respect to the total amount of monomer composition employed. The duration of the critical period was 20 minutes.

After degassing, with a yield of 64%, a powdery copolymer of vinyl chloride and vinyl acetate consisting of 99% vinyl chloride and 1% vinyl acetate by weight, having an AFNOR viscosity index of 141, was recovered. The portion of said copolymer passing through a 250 micron mesh sieve represented 97% by weight thereof; same displayed an apparent density of 0.53 g/cm$^3$, and could take up 31 ml of plasticizer in the cold state.

EXAMPLE 12

This example too is given for comparative purposes. Prepolymerization was conducted as in Example 3.

After 20 minutes of prepolymerization, the degree of conversion being about 10%, the prepolymer was transferred to the polymerizer, which had been purged by degassing 20 kg of vinyl chloride and which contained 130 kg vinyl chloride and 82.5 g terybutyl perethoxyacetate corresponding to 7.5 g active oxygen. The velocity of the agitator A was controlled at 50 rpm and that of agitator B at 30 rpm. The temperature of the reaction medium was rapidly raised to 38° C. and maintained there, this corresponds to a relative pressure of 5 bar in the polymerizer. The duration of the critical period was 35 minutes. Polymerization in the polymerizer lasted for 5 hours.

After degassing, with a yield of 62%, a powdery polymer having an AFNOR viscosity index of 180, was recovered. The portion of said polymer passing through a 250 micron mesh sieve represented 82% by weight thereof; same displayed an apparent density of 0.42 g/cm$^3$, and could take up to 38 ml plasticizer in the cold state.

EXAMPLE 13

The process was conducted as in Example 12, but with the introduction into the polymerizer of 325 g of the solution of the vinyl acetate/crotonic acid copolymer utilized in Example 3, amounting to 516 ppm of said copolymer with respect to the total amount of vinyl chloride employed. The duration of the critical period was 35 minutes.

After degassing, with a yield of 63%, a powdery polymer having an AFNOR viscosity index of 181, was recovered. The portion of said polymer passing through a 250 micron mesh sieve represented 96% by weight thereof; same displayed an apparent density of 0.46 g/cm$^3$, and could take up 37 ml plasticizer in the cold state.

EXAMPLE 14

This example is also given for purposes of comparison.

Prepolymerization was conducted as in Example 1.

After 15 minutes of prepolymerization, the degree of conversion being about 10%, the prepolymer was transferred to the polymerizer which had been previously purged by degassing 20 kg vinyl chloride and which contained 130 kg vinyl chloride and 22.25 g ethyl peroxydicarbonate corresponding to 2 g active oxygen and 75 g lauroyl peroxide corresponding to 3 g active oxygen. The velocity of agitation of agitator A was controlled at 50 rpm and that of agitator B at 30 rpm. The temperature of the reaction medium was rapidly raised to and maintained at 69° C., corresponding to a relative pressure in the polymerizer of 11.5 bar. The duration of the critical period was 30 minutes. The polymerization in the polymerizer lasted for 3.5 hours.

After degassing, with a yield of 70%, a powdery polymer having an AFNOR viscosity index of 78 was recovered. The portion of said polymer passing through a 250 micron mesh sieve was 92% by weight thereof; same displayed an apparent density of 0.58 g/cm$^3$ and could take up 12 ml plasticizer in the cold state.

EXAMPLE 15

The process was conducted as in Example 14, but with the introduction into the prepolymerizer of 1.25 g of the solution of vinyl acetate/crotonic acid copolymer used in Example 2, amounting to 2 ppm of said copolymer with respect to the total amount of vinyl chloride employed.

After degassing, with a yield of 70%, a powdery polymer having an AFNOR viscosity index of 78 was recovered. The portion of said polymer passing through a 250 micron mesh sieve represented 97% by weight thereof; same displayed an apparent density of 0.60 g/cm$^3$, and could take up 12 ml plasticizer in the cold state.

EXAMPLE 16

This example too is given for purposes of comparison.

Into the prepolymerizer, 135 kg of vinyl chloride were introduced and the apparatus purged by the degassing of 10 kg vinyl chloride. Similarly, 3.125 kg propylene, 8.3 g acetylcyclohexanesulfonyl peroxide corresponding to 0.6 g active oxygen and 22.25 g ethyl peroxydicarbonate corresponding to 2 g active oxygen, were introduced. The velocity of agitation was controlled at 400 rpm. The temperature of the reaction medium was raised to and maintained at 69° C., corresponding to a relative pressure of 12 bar in the prepolymerizer. After 30 minutes of prepolymerization, the degree of conversion being about 10%, the prepolymer was transferred to the polymerizer, which had been previously purged by the degassing of 20 kg vinyl chloride and contained 130 kg vinyl chloride, 3.3 kg propylene, 69.4 g acetylcyclohexanesulfonyl peroxide corresponding to 5 g active oxygen and 100.1 g ethyl peroxydicarbonate corresponding to 9 g active oxygen. The velocity of agitation was controlled at 50 rpm for agitator A and at 5 rpm for agitator B. The temperature of the reaction medium was rapidly raised to 55° C. and was maintained at this level, corresponding to relative pressure of 8.4 bar in the polymerizer. The duration of the critical period was 40 minutes. The polymerization in the polymerizer lasted for 5 hours.

After degassing, with a yield of 79%, a powdery copolymer of vinyl chloride and propylene consisting of 99% by weight of vinyl chloride and 1% propylene and having an AFNOR viscosity index of 100, was recovered. The portion of said copolymer passing through a 250 micron mesh sieve represented 92% by weight thereof; same displayed an apparent density of 0.60 g/cm$^3$, and could take up 20 ml plasticizer in the cold state.

EXAMPLE 17

The process was conducted as in Example 16, but with the introduction into the prepolymerizer of 18.75 g of the solution of vinyl acetate/crotonic acid copolymer used in Example 2, amounting to 30 ppm of said copolymer with respect to the total amount of the monomer composition employed. The duration of the critical period was 40 minutes.

After degassing, with a yield of 78%, a powdery copolymer of vinyl chloride and propylene consisting of 99% vinyl chloride and 1% propylene by weight, with an AFNOR viscosity index of 100, was recovered. The portion of said copolymer passing through a 250 micron mesh sieve represented 97% by weight thereof; same displayed an apparent density of 0.62 g/cm$^3$ and could take up 20 ml plasticizer in the cold state.

EXAMPLE 18

This example is also given for purposes of comparison.

Prepolymerization was conducted as in Example 1.

After 20 minutes of prepolymerization, the degree of conversion being about 10%, the prepolymer was transferred to the polymerizer which had been previously purged by the degassing of 20 kg vinyl chloride and which contained 130 kg vinyl chloride, 27.8 g acetylcyclohexanesulfonyl peroxide corresponding to 2 g active oxygen and 22.25 g ethyl peroxydicarbonate corresponding to 2 g active oxygen. The velocity of agitation of agitator A was controlled at 50 rpm and that of agitator B at 10 rpm. The temperature of the reaction medium was rapidly raised to and was maintained at 55° C., which corresponded to a relative pressure of 8.1 bar in the polymerizer. The duration of the critical period was 30 minutes. Polymerization in the polymerizer lasted for 4 hours.

After degassing, with a yield of 78%, a powdery polymer having an AFNOR viscosity index of 108, was recovered. The portion of said polymer passing through a 250 micron mesh sieve represented 93% by weight thereof; same displayed an apparent density of 0.56 g/cm$^3$, and could take up 21 ml plasticizer in the cold state.

EXAMPLE 19

The process was conducted as in Example 18, but with the introduction into the polymerizer of 10 g of ethylene oxide condensate with polypropylene glycol as used in Example 5, amounting to 40 ppm of said condensate with respect to the total amount of vinyl chloride employed. The duration of the critical period was 30 minutes.

After degassing, with a yield of 77%, a powdery polymer having an AFNOR viscosity index of 108 was recovered. The portion of said polymer passing through a 250 micron mesh sieve represented 98% by weight thereof; same displayed an apparent density of 0.62 g/cm$^3$, and could take up 20 ml plasticizer in the cold state.

EXAMPLE 20

The process was conducted as in Example 18, but with the introduction into the prepolymerizer of 0.5 g of the ethylene oxide condensate with polypropylene glycol used in Example 5, amounting to 2 ppm of said condensate with respect to the total amount of vinyl chloride employed. The duration of the critical period was 30 minutes.

After degassing, with a yield of 78%, a powdery polymer having an AFNOR viscosity index of 108, was recovered. The portion of said polymer passing through a 250 micron mesh sieve represented 97% by weight thereof; said displayed an apparent density of 0.60 g/cm$^3$, and could take up 21 ml plasticizer in the cold state.

EXAMPLE 21

The process was conducted as in Example 18, but with the introduction into the prepolymerizer of 6.25 g of the vinyl acetate/crotonic acid copolymer used in Example 2 and in the polymerizer of 0.5 g ethylene oxide condensate with polypropylene glycol used in Example 5, amounting to 10 ppm of said copolymer and 2 ppm of said condensate with respect to the total amount of vinyl chloride employed.

After degassing, with a yield of 78%, a powdery polymer having an AFNOR viscosity index of 108, was recovered. The portion of said polymer passing through a 250 micron mesh sieve represented 97% by weight thereof; same displayed an apparent density of 0.62 g/cm$^3$, and could take up 21 ml plasticizer in the cold state.

EXAMPLE 22

The process was conducted as in Example 18, but with the introduction into the prepolymerizer of 37.5 g of a 40% by weight solution in propanol of a copolymer of vinyl acetate and crotonic acid, comprising by weight 94% of the vinyl acetate and 6% of the crotonic acid, with a limiting viscosity of 0.187, amounting to 60 ppm of said copolymer with respect to the total amount of vinyl chloride employed. The duration of the critical period was 30 minutes.

After degassing, with a yield of 78%, a powdery polymer having an AFNOR viscosity index of 108, was recovered. The portion of said polymer passing through a 250 micron mesh sieve represented 98% by weight thereof; same displayed an apparent density of 0.61 g/cm$^3$, and could take up 21 ml plasticizer in the cold state.

EXAMPLE 23

The process was conducted as in Example 18, but with the introduction into the prepolymerizer of 2.5 g of an ethylene oxide condensate with polypropylene glycol, having a molecular weight of 950, and having an ethylene oxide/propylene glycol weight ratio of 50, amounting to 10 ppm of said condensate with respect to the total amount of vinyl chloride employed. The duration of the critical period was 30 minutes.

After degassing, with a yield of 77%, a powdery polymer having an AFNOR viscosity of 108 was recovered. The portion of said polymer passing through a 250 micron mesh sieve represented 97% by weight thereof; same displayed an apparent density of 0.62 g/m$^3$, and could take up 20 ml plasticizer in the cold state.

EXAMPLE 24

The process was conducted as in Example 18, but by introducing into the prepolymerizer 1.25 g of a condensate of ethylene oxide with polypropylene glycol, having a molecular weight of 1,750, and having an ethylene oxide/propylene glycol weight ratio of 20, amounting to 5 ppm of said condensate with respect to the total amount of vinyl chloride employed. The duration of the critical period was 30 minutes.

After degassing, with a yield of 77%, a powdery polymer with an AFNOR viscosity index of 108, was recovered. The portion of said polymer passing through a 250 micron mesh sieve represented 97% by weight thereof; same displayed an apparent density of 0.62 g/cm$^3$, and could take up 20 ml of plasticizer in the cold state.

EXAMPLE 25

The process was conducted as in Example 18, but with the introduction of, one-half in the polymerizer and one-half in the prepolymerizer, 31.25 g of a 40% by weight solution in propanol of a copolymer of vinyl acetate and acrylic acid, composed by weight of 95% vinyl acetate and 5% acrylic acid, with a viscosity limit of 0.190, amounting to 50 ppm of said copolymer with respect to the total amount of vinyl chloride employed. The duration of the critical period was 30 minutes.

After degassing, with a yield of 73%, a powdery polymer having an AFNOR viscosity of 108 was recovered. The portion of said polymer passing through a 250 micron mesh sieve represented 97% by weight thereof; same displayed an apparent density of 0.60 g/cm³, and could take up 21 ml plasticizer in the cold state.

EXAMPLE 26

The process was conducted as in Example 18, but with the introduction of, one-half in the prepolymerizer and one-half in the polymerizer, 6.25 g of a 40% solution by weight in propanol of a copolymer of vinyl acetate and acrylic acid composed of 82% by weight of vinyl acetate and 18% acrylic acid, with a limiting viscosity of 0.130, amounting to 10 ppm of said copolymer with respect to the total amount of vinyl chloride employed. The duration of the critical period was 30 minutes.

After degassing, with a yield of 80%, a powdery polymer having an AFNOR viscosity index of 108 was recovered. The portion of said polymer passing through a 250 micron mesh sieve represented 97% by weight thereof; same displayed an apparent density of 0.60 g/cm³, and could take up 21 ml plasticizer in the cold state.

EXAMPLE 27

The process was conducted as in Example 18, but with the introduction into the prepolymerizer of 18.75 g of a 40% solution by weight in propanol of a copolymer of vinyl acetate and methacrylic acid, composed of 85% vinyl acetate and 15% methacrylic acid, with a limiting viscosity of 0.135, amounting to 30 ppm of said copolymer with respect to the total quantity of vinyl chloride employed. The duration of the critical period was 30 minutes.

After degassing, with a yield of 80%, a powdery polymer having an AFNOR index of viscosity of 108 was recovered. The portion of said polymer passing through a 250 micron mesh sieve represented 97% by weight thereof; same displayed an apparent density of 0.60 g/cm³, and could take up 20 ml plasticizer in the cold state.

EXAMPLE 28

The process was conducted as in Example 18, but with the introduction into the prepolymerizer of 62.5 g of a 40% by weight solution in propanol of a copolymer of vinyl acetate and maleic acid composed of 97% by weight of vinyl acetate and 3% maleic acid, with a limiting viscosity of 0.180, amounting to 100 ppm of said copolymer with respect to the total amount of vinyl chloride employed. The duration of the critical period was 30 minutes.

After degassing, with a yield of 80%, a powdery polymer having an AFNOR viscosity index of 108, was recovered. The portion of said polymer passing through a 250 micron mesh sieve represented 97% by weight thereof; same displayed an apparent density of 0.60 g/cm³, and could take up 21 ml plasticizer in the cold state.

EXAMPLE 29

This example is also given for the purposes of comparison.

Into a prepolymerizer of 400 liter capacity, made of stainless steel and equipped with an agitator consisting of a "Lightnin" type turbine bearing 6 impeller plates 300 mm in diameter, 280 kg vinyl chloride were introduced and the apparatus purged by degassing 30 kg of the vinyl chloride. Similarly, 22.2 g acetylcyclohexanesulfonyl peroxide, corresponding to 1.6 g active oxygen, and 11.1 g ethyl peroxydicarbonate, corresponding to 1 g active oxygen, were also introduced. The velocity of agitation was controlled at 400 rpm. The temperature of the reaction medium in the prepolymerizer was raised to and maintained at 69° C., corresponding to a relative pressure of 11.5 bar in the prepolymerizer.

After 15 minutes of prepolymerization, the degree of conversion was in the vicinity of 10% and the prepolymer was transferred into the polymerizer, described in Example 1, which had been previously purged by the degassing of 20 kg vinyl chloride and which contained 59 g acetylcyclohexanesulfonyl peroxide, corresponding to 4.25 g active oxygen. The velocity of agitation of the agitator A was controlled at 50 rpm and that of agitator B at 30 rpm. The temperature of the reaction medium was rapdily raised to and maintained at 46° C., which corresponds to a relative pressure of 6.3 bar in the polymerizer. The duration of the critical period was 40 minutes. Polymerization in the polymerizer lasted for 6 hours.

After degassing, with a yield of 63%, a powdery polymer having an AFNOR viscosity index of 144, was recovered. The portion of said polymer passing through a 250 micron mesh sieve represented 85% by weight thereof; same displayed an apparent density of 0.43 g/cm³, and could take up 30 ml plasticizer in the cold state.

EXAMPLE 30

The process was conducted as in Example 29, but with the introduction into the prepolymerizer of 2.5 g of an ethylene oxide condensate with polypropylene glycol, having a molecular weight of 2,250, and having an ethylene oxide/propylene glycol weight ratio equal to 40, amounting to 10 ppm of said condensate with repsect to the total amount of vinyl chloride employed. The duration of the critical period was 40 minutes.

After degassing, a powdery polymer having an AFNOR viscosity index of 144 was recovered. The portion of said polymer passing through a 250 micron mesh sieve represented 96% by weight thereof; same displayed an apparent density of 0.48 g/cm³, and could take up 30 ml plasticizer in the cold state.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A process for the preparation of vinyl chloride polymer, comprising mass prepolymerizing vinyl chloride monomer in a first phase under highly turbulent agitation until a degree of conversion thereof of between about 5 and 15% by weight of the vinyl cloride polymer is attained, and thence, in a second distinct phase, mass polymerizing said prepolymerized reaction product through reaction completion under mild agitation, said process being characterized in that (i) there is added to the reaction medium, prior to same attaining a polymer content of about 15% by weight of the reaction medium, an additive in an amount sufficient to provide a polymer product comprising at least 95% by weight of a fraction which will pass through a 250 micron mesh sieve, wherein said additive is selected from the group consisting of (a) a copolymer of vinyl acetate and an ethylenicallly unsaturated carboxylic acid comonomer copolymerizable therewith, and (b) a condensate of ethylene oxide on a polypropylene glycol backbone, and (ii) controlling the rate of reaction such that the period of time during which the polymer content by weight in the reaction medium is between 15 and 25%, is less than 45 minutes.

2. The process as defined by claim 1, said copolymer (a) comprising from about 80 to 98% by weight vinyl acetate and from about 20 to 2% by weight of a carboxylic acid selected from the group consisting of acrylic acid, methacrylic acid, crotonic acid and maleic acid.

3. The process as defined by claim 2, said copolymer (a) comprising from about 90 to 96% by weight of the vinyl acetate and from about 10 to 4% by weight of the carboxylic acid.

4. The process as defined by claim 2, said copolymer (a) having a limiting viscosity of between about 0.10 and 0.25.

5. The process as defined by claim 1, said condensate (b) having a molecular weight between about 900 and 2300 and a ratio by weight of ethylene oxide/propylene glycol of between about 10 and 90%.

6. The process as defined by claim 1, wherein the copolymer (a) is added, in an amount of from about 1 to 600 ppm, based upon the total amount of monomer.

7. The process as defined by claim 1, wherein the condensate (b) is added, in an amount of from about 1 to 50 ppm, based upon the total amount of monomer.

8. The process as defined by claim 1, wherein the condensate (b) is added, in an amount of from about 1 to 15 ppm, based upon the total amount of monomer.

9. The process as defined by claim 1, wherein both the copolymer (a) and the condensate (b) are added, the former in an amount of from about 1 to 600 ppm, and the latter in an amount of from about 1 to 15 ppm, both based upon the total amount of monomer.

10. The process as defined by claim 1, wherein the additive is added during the prepolymerization first phase.

11. The process as defined by claim 1, wherein the additive is added during the polymerization second phase.

12. The process as defined by claim 1, wherein the additive is added during both the prepolymerization first phase and the polymerization second phase.

13. The process as defined by claim 6, wherein a solution of the copolymer (a) is added.

14. The process as defined by claim 1, further comprising the addition to the reaction medium of a supplemental amount of vinyl chloride monomer following prepolymerization.

15. The process as defined by claim 1, further comprising recovering a polymer product comprising at least 95% by weight of a fraction which will pass through a 250 micron mesh sieve.

16. The process as defined by claim 15, from 95% to 98% by weight of said fraction being able to pass through a 250 micron mesh sieve.

17. The process as defined by claim 1, the reaction medium further contains a polymerization initiator.

18. The process as defined by claim 16, said initiator being a member selected from the group consisting of azodiisobutyronitrile, lauroyl peroxide, acetylcyclohexanesulfonyl peroxide, isobutyroyl peroxide, dichloroacetyl peroxide, trichloroacetyl peroxide, ethyl peroxydicarbonate, ethylhexyl peroxydicarbonate, isopropyl peroxydicarbonate, isobutyl peroxydicarbonate, tertbutyl permethoxyacetate, tertbutyl perethoxyacetate, and tertbutyl perphenoxy-2-propionate.

19. The process as defined by claim 1, 2 or 3 wherein the vinyl chloride monomer is copolymerized in said first phase with an olefinically unsaturated comonomer copolymerizable therewith.

* * * * *

UNITED STATES PATENT AND TRADEMARK OFFICE
CERTIFICATE OF CORRECTION

PATENT NO. : 4,268,651

DATED : May 19, 1981

INVENTOR(S) : Francois Erard et al.

It is certified that error appears in the above—identified patent and that said Letters Patent is hereby corrected as shown below:

Column 3, line 47, "$(t=t_o/t_oC)$" and insert -- $(t-t_o/t_oC)$ --.

Column 14, line 19, "rapdily" should read -- rapidly --.

Column 14, line 38, "40" should read -- 40% --.

Signed and Sealed this

Fourteenth Day of September 1982

[SEAL]

Attest:

Attesting Officer

GERALD J. MOSSINGHOFF

*Commissioner of Patents and Trademarks*